(12) United States Patent
Bhogal et al.

(10) Patent No.: US 8,688,866 B1
(45) Date of Patent: Apr. 1, 2014

(54) GENERATING RECOMMENDATIONS FOR PERIPHERAL DEVICES COMPATIBLE WITH A PROCESSOR AND OPERATING SYSTEM OF A COMPUTER

(71) Applicant: International Business Machine Corporation, Armonk, NY (US)

(72) Inventors: Kulvir S. Bhogal, Fort Worth, TX (US); Gregory J. Boss, Saginaw, MI (US); David B. Lection, Raleigh, NC (US); Anne R. Sand, Canon City, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/625,894

(22) Filed: Sep. 25, 2012

(51) Int. Cl.
G06F 13/10 (2006.01)
(52) U.S. Cl.
USPC .............................. 710/15; 710/72
(58) Field of Classification Search
None
See application file for complete search history.

(56) References Cited

U.S. PATENT DOCUMENTS

| | | | |
|---|---|---|---|
| 6,581,157 B1 * | 6/2003 | Chiles et al. | 713/1 |
| 7,185,336 B2 | 2/2007 | Vaughan | |
| 7,191,364 B2 * | 3/2007 | Hudson et al. | 714/38.11 |
| 7,191,438 B2 * | 3/2007 | Bryant | 717/176 |
| 7,512,584 B2 | 3/2009 | Keith, Jr. | |
| 7,574,481 B2 * | 8/2009 | Moore et al. | 709/217 |
| 7,581,217 B2 * | 8/2009 | Jhanwar et al. | 717/168 |
| 7,594,219 B2 | 9/2009 | Ramachandran et al. | |
| 7,640,363 B2 * | 12/2009 | Teodosiu et al. | 709/247 |
| 7,930,583 B1 * | 4/2011 | Vemuri et al. | 714/4.1 |
| 7,934,213 B2 * | 4/2011 | Cobb | 717/174 |
| 8,073,844 B2 | 12/2011 | Bhesania | |
| 2006/0130073 A1 * | 6/2006 | Faist et al. | 719/321 |
| 2008/0244519 A1 | 10/2008 | Sciacqua et al. | |
| 2008/0301666 A1 | 12/2008 | Gordon et al. | |
| 2011/0231586 A1 * | 9/2011 | Komano et al. | 710/18 |

* cited by examiner

Primary Examiner — Cheng-Yuan Tseng
(74) Attorney, Agent, or Firm — Scott S. Dobson; John R. Pivnichny (57) ABSTRACT

Computer program code (program code) identifies peripheral devices connected to a computer having a log file. Program code determines whether the peripheral devices identified are functioning properly or not functioning properly. The program code collects information about the configuration of the computer. The program code sets parameters that create a profile for the computer. The program code stores the profile and the log file in a database along with profiles and log files of other computers having peripheral devices identified by the program code. The program code utilizes the profiles and log files to generate recommendations for peripheral devices that are compatible with at least one processor and operating system of the computer.

14 Claims, 4 Drawing Sheets

GENERATING RECOMMENDATIONS FOR PERIPHERAL DEVICES COMPATIBLE WITH A PROCESSOR AND OPERATING SYSTEM OF A COMPUTER

BACKGROUND

1. Field of the Invention

The present invention relates generally to peripheral devices, and more specifically to electronically generating recommendations for peripheral devices that are compatible with a processor and operating system of a computer.

2. Description of the Related Art

In the computer industry various manufacturers supply peripheral devices that are compatible with multiple computers and operating systems. Compatibility of peripheral devices with multiple computers and operating systems is made possible through the use of open interface standards. Peripheral devices that adhere to open interface standards are more interchangeable and interoperable than peripheral devices that do not adhere to such standards.

It is known for an operating system of a computer to define a device driver interface for a particular class of peripheral devices, which allows the operating system to access each of the peripheral devices of that class in a consistent manner that is independent of the particular peripheral devices. Moreover, each of the peripheral devices have a corresponding device driver that is typically supplied by a manufacturer of the device, wherein the device driver is computer program code that allows a processor, operating system and high-level computer programs (i.e., software applications) of a computer to interact with the peripheral devices via the device driver interface.

However, oftentimes new peripheral devices are not compatible with a processor and an operating system of a computer, because a device driver that supports the peripheral device and is compatible with the processor and the operating system has not been created. Particularly, device drivers are not created for various reasons, for example some manufacturers of the peripheral devices may not be able to keep up with newly developed processors and operating systems, or some manufacturers may determine that the cost of creating device drivers that are compatible with a particular processor and operating system outweighs the benefit, based on analysis of data generated from end-user surveys (i.e., end-user feedback) in regard to amount usage of the peripheral devices.

End-user surveys are one of the primary methods for a manufacturer to determine compatible device drivers that the end-user needs. However, an end-user survey whether online or in-person is a manual process that requires direct responses from the end-user. The responses received from the end-user may be incorrect, because the end-user may not know the information that the survey is requesting. As a result, manufacturers may recommend a wrong device driver or even undertake development of a new device driver that is not widely needed by consumers, based on receipt of incorrect information from the end-user.

SUMMARY

Aspects of an embodiment of the present invention disclose a method, computer system, and program product for generating recommendations for a peripheral device that is compatible with a processor and operating system. Computer program code identifies peripheral devices connected to one or more computers each having log files. The computer program code determines whether the peripheral devices identified are functioning properly or not functioning properly. The computer program code collects information about a configuration of each of the one or more computers. The computer program code sets parameters that create profiles for each of the one or more computers. The computer program code stores the profiles and the log files in a database, wherein each of the log files is associated to one of the profiles. The computer program code sends a request to a server computer, wherein the request has criteria to retrieve recommendations for peripheral devices that are functioning properly and are of a same class as at least one of peripheral devices identified and not functioning properly, and that are compatible with at least one processor and operating system of the one or more computers having the at least one of peripheral devices identified and not functioning properly. The computer program code queries the database, in response to the request, for the profiles and the log files of the one or more computers having peripheral devices that satisfy the criteria. The computer program code generates the recommendations and electronic reports based on the profiles and the log files returned by the database in response to the query.

BRIEF DESCRIPTION OF THE SEVERAL VIEWS OF THE DRAWINGS

The subject matter which is regarded as an embodiment of the present invention is particularly pointed out and distinctly claimed in the claims at the conclusion of the specification. One manner in which recited features of an embodiment of the present invention can be understood is by reference to the following detailed description of embodiments, taken in conjunction with the accompanying drawings in which:

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA, Smalltalk, C++ or the like, conventional procedural programming languages such as the "C" programming language, a hardware description language such as VERILOG, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Exemplary embodiments now will be described more fully herein with reference to the accompanying drawings. This disclosure may, however, be embodied in many different forms and should not be construed as limited to the exemplary embodiments set forth herein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

Embodiments of the present invention provide computer program code for generating recommendations for a peripheral device that is compatible with a processor and operating system of a computer. The computer program code includes device compatibility client software having functionality for collecting information about the configuration of the computer, and device compatibility server software having functionality for generating the recommendations by utilizing the information that is collected about the configuration. The recommendations can be viewed by an end-user via a graphical user interface of the computer program code.

Specifically, the computer program code identifies each peripheral device that is connected to a client computer of the end-user and working properly with a corresponding device driver, and collects a variety of information about the configuration of the client computer including information about the operating system and processor of the client computer. The information collected is used to define a profile of the end-user's client computer. The computer program code can utilize the profile of the end-user's client computer together with other such profiles of additional client computers, which may be owned by other end-users, to generate recommendations for peripheral devices that are compatible with the processor and operating system of the end-user's client computer.

Figure 1:
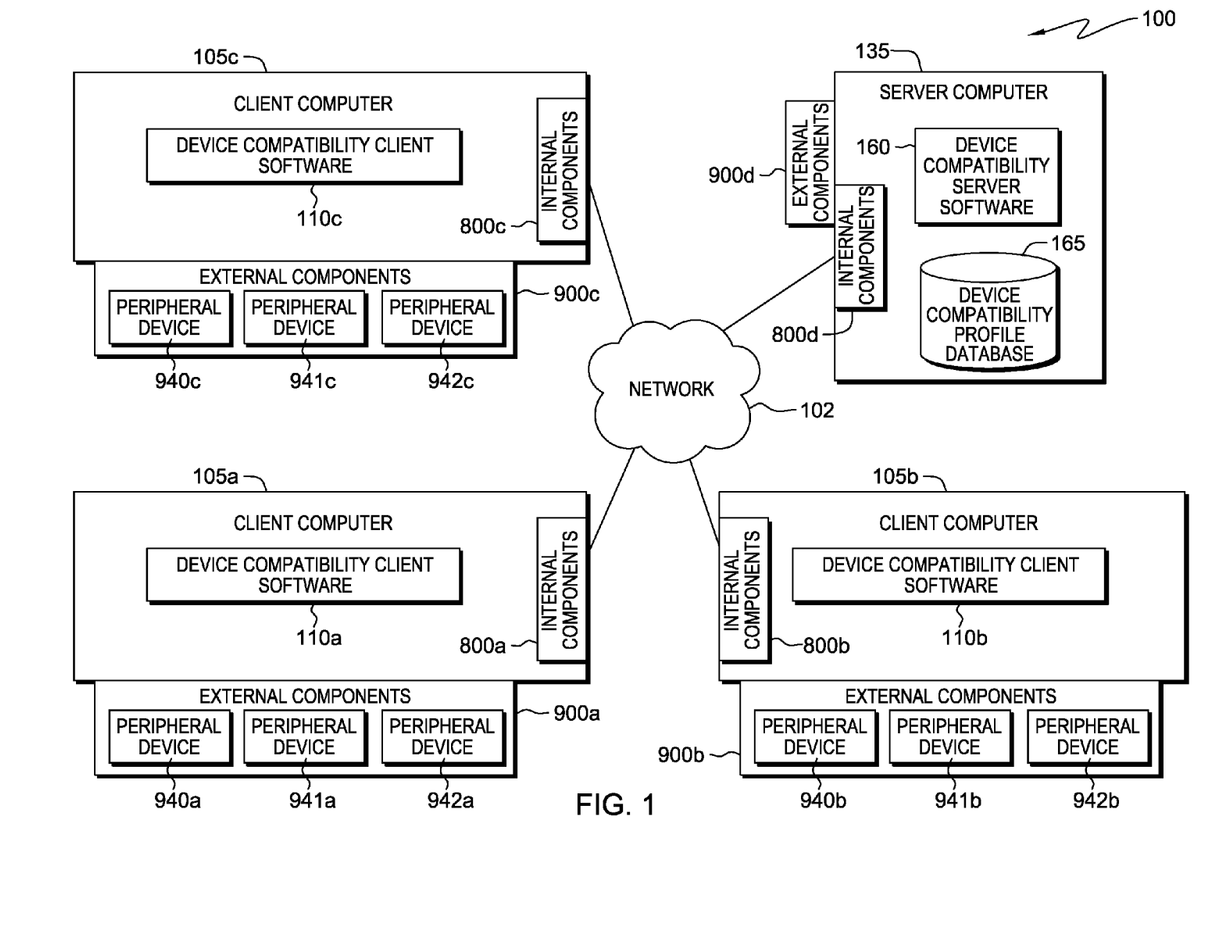
FIG. 1 is a block diagram of a distributed computer system, including client computers each installed with device compatibility client software that send information to a server computer installed with device compatibility server software, wherein the device compatibility server software utilizes the information received from the device compatibility client software to generate recommendations for peripheral devices that are compatible with a processor and an operating system of the client computers according to an embodiment of the present invention.

FIG. 1 illustrates computer system 100 that includes network 102, client computers 105*a*-105*c* with respective device compatibility client software 110*a*-110*c*, and server computer 135 with device compatibility server software 160 and device compatibility profile database 165. In addition, client computers 105*a*-105*c* each include respective internal components 800*a*-800*c* and respective external components 900*a*-900*c*, wherein internal components 800*a*-800*c* each include their own processors 820 and operating systems 828 (shown in FIG. 3). The type of processors 820 and operating systems 828 of each of client computers 105*a*-105*c* may vary. Server computer 135 includes internal components 800*d* and external components 900d. Moreover, in the disclosed embodiment, external components 900a, 900b, and 900c include respective peripheral devices 940a-942a, 940b-942b, and 940c-942c. However, in alternative embodiments, external components 900a, 900b, and 900c may include fewer or even more peripheral devices than shown. Internal components 800a-800d, and respective external components 900a-900d are described below in more detail with respect to FIG. 3.

Furthermore, device compatibility client software 110a, 110b, and 110c include functionality for: identifying respective peripheral devices 940a-942a, 940b-942b, and 940c-942c; determining whether peripheral devices 940a-942a, 940b-942b, and 940c-942c are functioning properly with a corresponding device driver; collecting information about the configuration of each of respective client computers 105a, 105b, and 105c; setting parameters that define a profile for each of respective client computers 105a, 105b, and 105c by utilizing the collected information about the configuration; and reporting errors that occur during installation and post installation of device drivers, on client computers 105a-105c, that support communication between at least one operating system (e.g., operating system 828) and respective peripheral devices 940a-942a, 940b-942b, and 940c-942c. In the disclosed embodiment, device compatibility client software 110c determines that respective peripheral device 940c is not functioning properly with a corresponding device driver. As a result, device compatibility client software 110c sends a request to device compatibility server software 160 to provide recommendations for peripheral devices that are of the same class as peripheral device 940c, and are compatible with at least one processor 820 and at least one operating system 828 of client computer 105c. In response to the request, device compatibility server software 160 generates the recommendations. Specifically, device compatibility server software 160 generates the recommendations for the peripheral devices that are compatible by utilizing the profiles and reported errors mentioned above, wherein the profiles and the reported errors may be stored on a computer readable tangible storage device (e.g., device compatibility profile database 165).

Figure 2A:
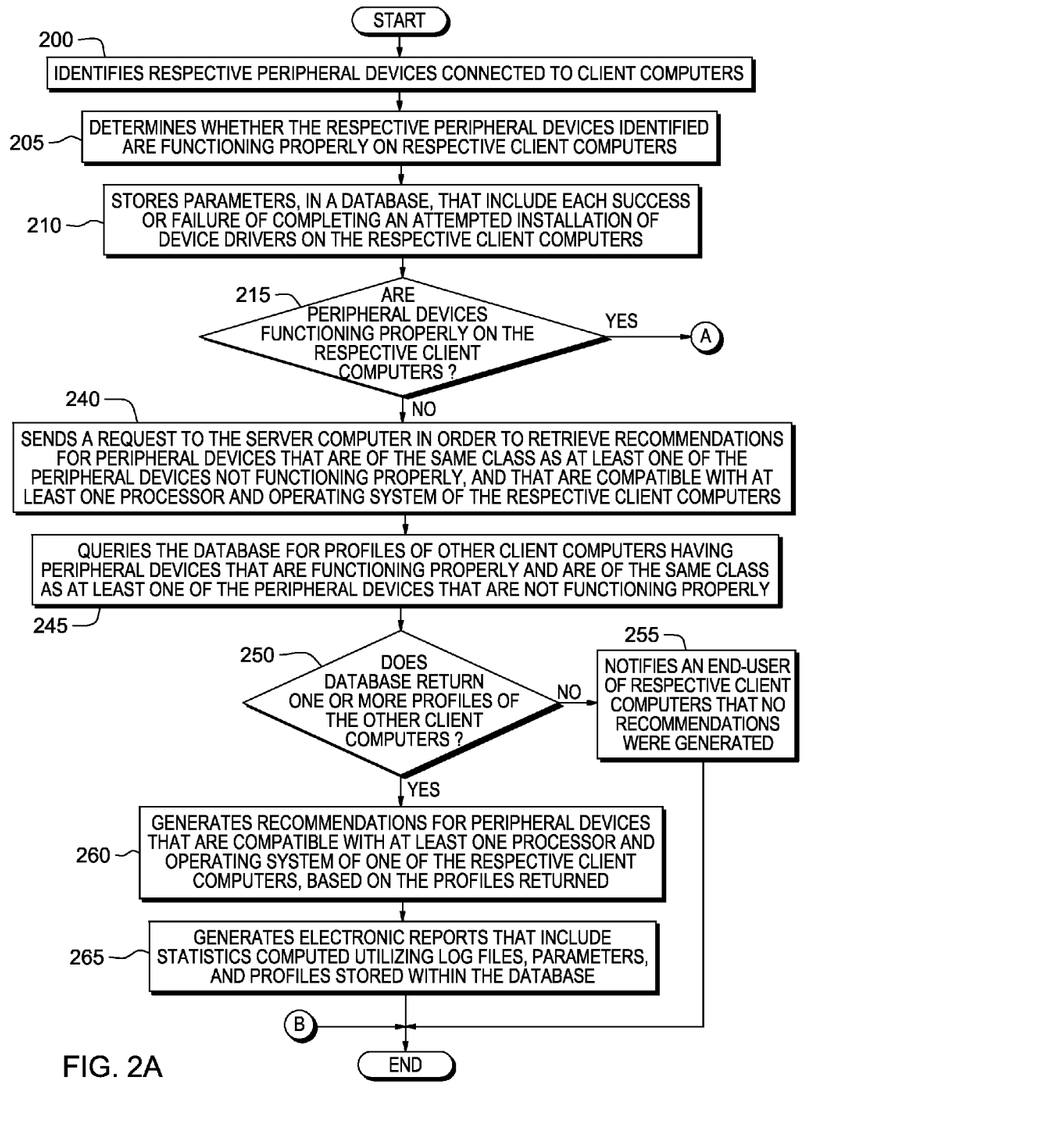
FIGS. 2A and 2B are flowcharts illustrating operations of computer program code for generating the recommendations for peripheral devices compatible with the processor and the operating system of one of the client computers of FIG. 1, wherein the computer program code includes the device compatibility client software and the device compatibility server software according to an embodiment of the present invention.
Figure 2B:
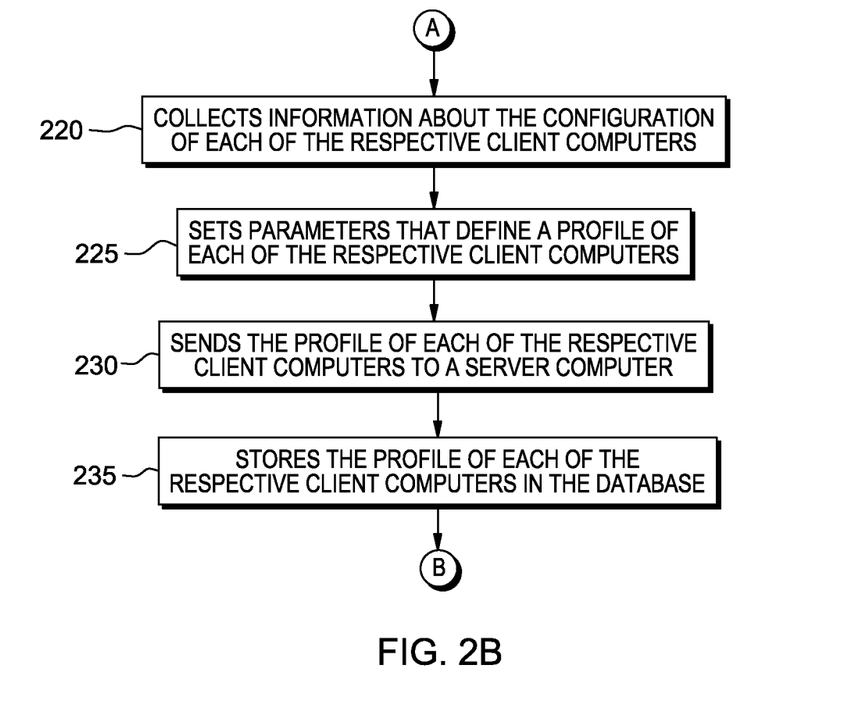

FIGS. 2A and 2B are flowcharts illustrating operations of computer program code for generating recommendations for peripheral devices compatible with at least one processor and at least one operating system of an end-user's client computer. Specifically, in the disclosed embodiment, the computer program code includes device compatibility client software 110a-110c and device compatibility server software 160. Device compatibility client software 110a, 110b, and 110c identify respective peripheral devices 940a-942a, 940b-942b, and 940c-942c connected to respective client computers 105a, 105b, and 105c (block 200). The step of identifying peripheral devices 940a-942a, 940b-942b, and 940c-942c includes identifying a class of each of peripheral devices 940a-942a, 940b-942b, and 940c-942c. Some examples of a class are computer mice, keyboards, hard disk, expansion cards, graphic cards, computer printers, image scanners, tape drives, microphones, speakers, and webcams.

Next, device compatibility client software 110a, 110b, and 110c determines whether respective peripheral devices 940a-942a, 940b-942b, and 940c-942c identified are functioning properly (i.e., functioning without device driver errors) on respective client computers 105a, 105b, and 105c (block 205). For example, device compatibility client software 110a, 110b, and 110c can determine whether respective peripheral devices 940a-942a, 940b-942b, and 940c-942c are functioning properly with a corresponding device driver by reading a log file (e.g., a memory dump file) stored on a hard disk of each respective client computer 105a, 105b, and 105c. The log file includes information on device driver errors as well as a listing of successful and unsuccessful installations of device drivers on client computers 105a, 105b, and/or 105c. Device compatibility client software 110a-110c each interact with device compatibility server software 160 to store parameters, in device compatibility profile database 165, that include each success or failure of completing an attempted installation of device drivers (e.g., driver installation error) on respective client computers 105a-105c, and further include each post driver installation error (block 210). Specifically, the parameters are set by utilizing the log file (e.g., memory dump file), mentioned above, that can contain errors associated to one or more identified peripheral devices 940a-942a, 940b-942b, and/or 940c-942c. The errors associated to the one or more identified peripheral devices 940a-942a, 940b-942b, and/or 940c-942c may occur during an attempted installation of a device driver (i.e., driver installation errors) or even subsequent to a successful installation of the device driver (i.e., post driver installation errors) on respective client computers 105a, 105b, and/or 105c.

One example of an error that may occur during an attempted installation of a device driver is where the attempted installation fails to complete on client computers 105a, 105b, and/or 105c, because the device driver conflicts with another device driver that has already been installed on client computers 105a, 105b, and/or 105c. Errors that occur during an attempted installation can be recorded in the log file (e.g., a memory dump file) and subsequently stored as a parameter in device compatibility profile database 165. An example, of an error that may occur post driver installation is where the end-user successfully installs a device driver associated to peripheral device 941c on client computer 105c, but after the installation the device driver and peripheral device 941c interact in a way that results in a memory leak causing operating system 828 of client computer 105c to crash. Thus, in the above scenario, the memory leak is an example of a post device driver installation error, occurring subsequent to a successful installation of the device driver, wherein the post driver installation error can be recorded in the log file (e.g., a memory dump file) and subsequently stored as a parameter in device compatibility profile database 165. The stored parameters mentioned above can be associated to a profile of client computers 105a, 105b, and/or 105c.

In one embodiment, device compatibility client software 110a-110c can first record driver installation and post driver installation errors in log files (e.g., memory dump files) stored locally on a suitable computer readable tangible storage device of respective client computers 105a-105c. Subsequently, device compatibility client software 110a-110c can send the log files to server computer 135. Device compatibility server software 160 can utilize the log files received by server computer 135 to extract information (e.g., the driver installation errors and the post driver installation errors) to set the parameters, mentioned above, stored on device compatibility profile database 165. Device compatibility server software 160 can utilize the parameters as part of inputs needed to generate electronic reports and recommendations for peripheral devices that are compatible with client computers 105a, 105b, and/or 105c.

In addition, device compatibility server software 160 stores the log files, mentioned above, on device compatibility profile database 165 and associates each of the log files to a profile of one of client computers 105a-105c. As a result, device compatibility server software 160 can selectively extract the log files from device compatibility profile database 165 and utilize information within the log files to compute statistics on usage of client computers 105a, 105b, and/or 105c and respective peripheral devices 940a-942a, 940b-942b, and/or 940c-942c, by an end-user. For example, the statistics can include the amount and percentage of successful and unsuccessful installations of device drivers that support peripheral devices 940a-942a, 940b-942b, and/or 940c-942c, based on a given configuration (i.e., a specific processor and operating system combination) of respective client computers 105a, 105b, and/or 105c.

Subsequent to storing the parameters in device compatibility profile database 165, if peripheral devices 940a-942a, 940b-942b, and 940c-942c are functioning properly on respective client computers 105a, 105b, and 105c (the "YES" branch of decision block 215), then device compatibility client software 110a, 110b, and 110c collects information about the configuration of each of respective client computers 105a, 105b, 105c (block 220). The information about the configuration of each of respective client computers 105a, 105b, and 105c can include the following: a name of each manufacturer of each client computer 105a-105c; a product identifier (ID) of each client computer 105a-105c; a name of each manufacturer of each respective peripheral device 940a-942a, 940b-942b, and 940c-942c; a class of each of respective peripheral devices 940a-942a, 940b-942b, and 940c-942c; a product ID of each of respective peripheral devices 940a-942a, 940b-942b, and 940c-942c; a unique ID associated to each end-user that is utilizing client computers 105a-105c; names and versions of operating systems 828 (shown in FIG. 3) installed on client computers 105a-105c; the type of processors 820 (shown in FIG. 3) in client computers 105a-105c; device drivers installed or attempted to be installed on client computers 105a-105c; and software applications and any service packs installed on client computers 105a-105c. Subsequent to collecting the information about the configuration of client computers 105a-105c, device compatibility client software 110a-110c utilizes the information collected to set parameters that define a profile of each of respective client computers 105a-105c (block 225).

Next, device compatibility client software 110a-110c sends the profile of each of respective client computers 105a-105c to server computer 135 (block 230). Subsequently, device compatibility server software 160 stores the profile of each of respective client computers 105a-105c in device compatibility profile database 165 (block 235), and the computer program code ends. Additional client computers (not shown) having peripheral devices that are functioning properly with a corresponding device driver may be connected to network 102, wherein profiles of the additional computers may also be stored in device compatibility profile database 165. As more profiles of additional client computers are stored in device compatibility profile database 165, device compatibility server software 160 can utilize the profiles along with the parameters stored in device compatibility profile database 165 to generate more reliable recommendations for compatible peripheral devices. Furthermore, customer satisfaction ratings by other end-users with respect to the peripheral devices and device driver that support the peripheral devices can be obtained via in-person or Internet-based surveys, and subsequently stored in device compatibility profile database 165.

In the disclosed embodiment, peripheral device 940c is not functioning properly. Particularly, if one or more peripheral devices 940a-942a, 940b-942b, and 940c-942c are not functioning properly on respective client computers 105a, 105b, and 105c (the "NO" branch of decision block 215), then the corresponding device compatibility client software 110a, 110b, and 110c sends a request to server computer 135 in order to retrieve recommendations for peripheral devices that are of the same class as at least one of peripheral devices 940a-942a, 940b-942b, and 940c-942c not functioning properly, and that are compatible with at least one processor 820 and operating system 828 (shown in FIG. 3) of respective client computers 105a, 105b, and 105c (block 240).

In response to server computer 135 receiving the request, device compatibility server software 160 queries device compatibility profile database 165 for profiles of other client computers having peripheral devices that are functioning properly and are of the same class as at least one of peripheral devices 940a-942a, 940b-942b, and 940c-942c that are not functioning properly (block 245). The query can be configured by a system programmer/administrator to include various parameters representing information that defines the profile of client computers 105a, 105b, and/or 105c having respective peripheral devices 940a-942a, 940b-942b, and/or 940c-942c that are not functioning properly. Specifically, in regard to the various parameters, the query can include the following: a name of each manufacturer and/or a product ID of each such client computer 105a-105c; a name of a manufacturer of each peripheral device 940a-942a, 940b-942b, and 940c-942c not functioning properly; a class of each peripheral device 940a-942a, 940b-942b, and 940c-942c not functioning properly; a product ID of each peripheral device 940a-942a, 940b-942b, and 940c-942c not functioning properly; a unique ID associated to an end-user that is utilizing each such client computer 105a-105c; names and versions of operating systems 828 installed on each such client computer 105a-105c; the type of processors 820 in each such client computer 105a-105c; and software applications and any service packs installed on each such client computer 105. As a result, based on the query device compatibility profile database 165 can return profiles of additional client computers that possess at least some of the same configurations as client computers 105a, 105b, and/or 105c having respective peripheral devices 940a-942a, 940b-942b, and/or 940c-942c that are not functioning properly.

Next, if device compatibility profile database 165 does not return one or more profiles of the other client computers (the "NO" branch of decision block 250), then device compatibility server software 160 interacts with the appropriate device compatibility client software 110a-110c to notify an end-user of respective client computers 105a-105c that no recommendations were generated (block 255) and the computer program code ends.

However, if device compatibility profile database 165 returns one or more profiles of the other client computers (the "YES" branch of decision block 250), then device compatibility server software 160 generates recommendations for peripheral devices that are compatible with at least one processor 820 and operating system 828 of one of client computers 105a, 105b, and 105c, based on the profiles returned (block 260). For example, in the disclosed embodiment, if device compatibility client software 110c previously sent a request to server computer 135 with criteria to retrieve recommendations for peripheral devices that are of the same class as peripheral device 940c and are compatible with at least one processor 820 and operating system 828 of client computer 105c, then in response to the request device compatibility server software 160 queries device compatibility profile database 165 for profiles that satisfy the criteria. Device compatibility server software 160 collects the profiles returned by device compatibility profile database 165 in response to the query, and parses the profiles to extract information about peripheral devices that are compatible with at least one processor 820 and operating system 828 of client computer 105*c*. Utilizing the information extracted from the profiles, device compatibility server software 160 generates recommendations for peripheral devices that are of the same class as peripheral device 940*c* and are compatible with at least one processor 820 and operating system 828 of client computer 105*c*.

Specifically, in the disclosed embodiment, the recommendations that are generated can include information about the following: peripheral devices having an expected compatibility with processor 820 and operating system 828 of client computers 105*a*, 105*b*, and/or 105*c*; whether a device driver that the end-user is attempting to install on client computers 105*a*, 105*b*, and/or 105*c* is compatible with processor 820 and operating system 828 of client computers 105*a*, 105*b*, and/or 105*c*; whether older or newer versions of the device driver that the end-user is attempting to install is compatible with processor 820 and operating system 828 of the client computers 105*a*, 105*b*, and/or 105*c*; download locations (e.g., uniform resource locators) of versions of device drivers that support the peripheral devices having an expected compatibility with processor 820 and operating system 828 of client computers 105*a*, 105*b*, and/or 105*c*; customer satisfaction ratings by other end-users with respect to the peripheral devices having an expected compatibility with processor 820 and operating system 828 of client computers 105*a*, 105*b*, and/or 105*c*; customer satisfaction ratings by the other end-users with respect to the versions of the device driver that support the peripheral devices having an expected compatibility with processor 820 and operating system 828 of client computers 105*a*, 105*b*, and/or 105*c*; and other peripheral devices owned by the end-user that can be used in place of peripheral devices 940*a*-942*a*, 940*b*-942*b*, and 940*c*-942*c* that are not functioning properly. The recommendations that are generated can further include additional information of interest to the end-user resulting from device compatibility server software 160 processing profiles and parameters stored in device compatibility profile database 165, which can assist the end-user in selecting a peripheral device most compatible with each processor 820 and operating system 828 of respective client computers 105*a*, 105*b*, and/or 105*c*.

Subsequent to generating the recommendations, device compatibility server software 160 can send the recommendations to appropriate client computers 105*a*-105*c*, wherein the end-user can view the recommendations via a graphical user interface of the device compatibility client software 110*a*-110*c*. In addition, device compatibility server software 160 can even be integrated with a web server of a peripheral device vendor to provide the recommendations to an end-user that is attempting to purchase a peripheral device over the Internet, wherein the recommendations can be based on the peripheral device that the end-user is attempting to purchase and on the processor and operating system of the end-user's computer.

Furthermore, device compatibility server software 160 generates electronic reports that include statistics computed utilizing the log files, parameters, and profiles stored within device compatibility profile database 165 (block 265). Some examples of the statistics are the amount and percentage of successful and unsuccessful installations of device drivers, on client computers (e.g., client computers 105*a*-105*c*) connected to network 102, that support peripheral devices 940*a*-942*a*, 940*b*-942*b*, and/or 940*c*-942*c*, based on a given configuration (i.e., a specific processor 820 and operating system 828 combination) of respective client computers 105*a*, 105*b*, and/or 105*c*. In addition, the electronic reports generated can further include: information about processors 820, operating systems 828, and software applications of client computers 105*a*-105*c*; a list of device drivers that function properly with client computers 105*a*-105*c*; and a list of device drivers that do not function properly with client computers 105*a*-105*c*. Device compatibility server software 160 can send the electronic reports via network 102 to client computers 105*a*-105*c* and one or more manufacturers of peripheral devices 940*a*-942*a*, 940*b*-942*b*, and/or 940*c*-942*c*. The manufacturer can utilize the electronic reports to determine device drivers that may need to be maintained, and device drivers that may need to be developed to support both current and future needs of end-users.

Figure 3:
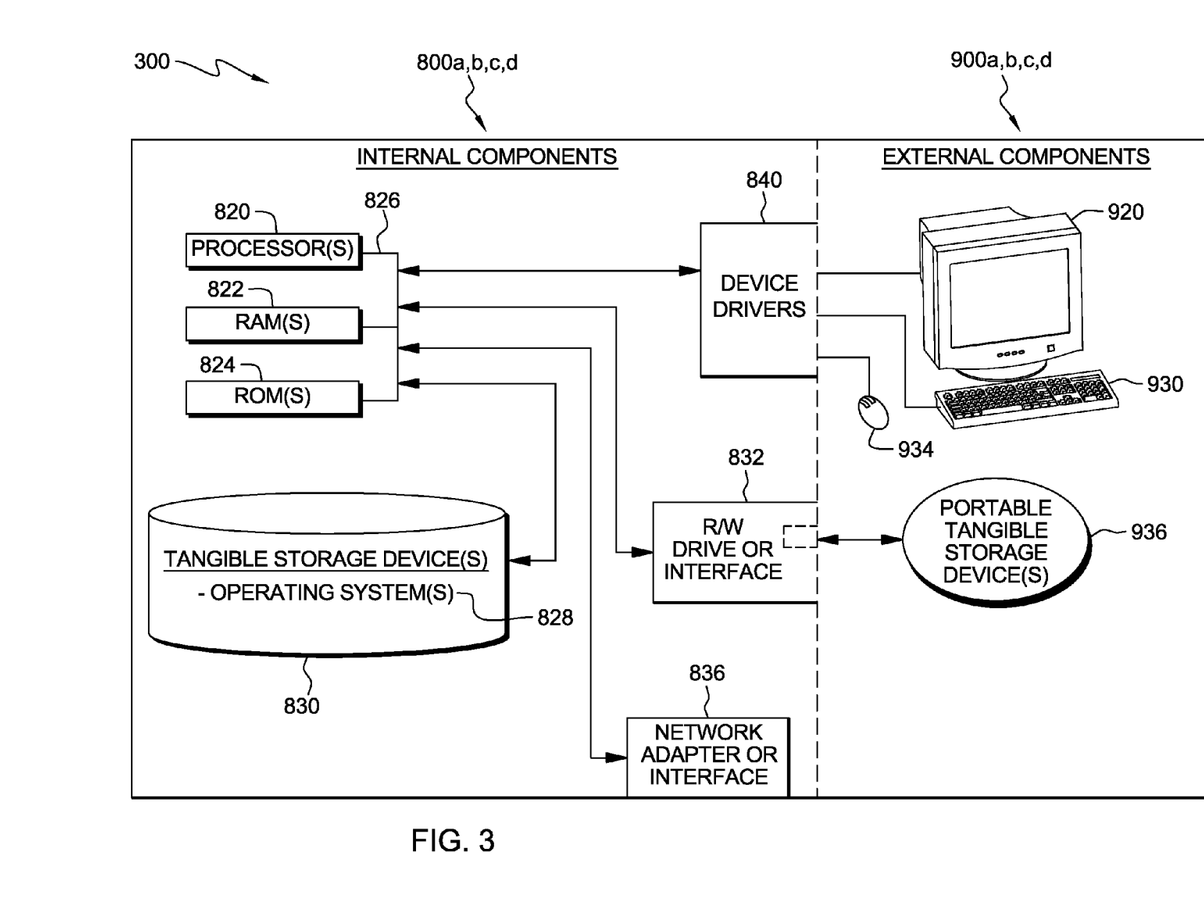
FIG. 3 is a block diagram depicting internal and external components of the client computers and the server computer of FIG. 1 according to an embodiment of the present invention.

FIG. 3 is a block diagram depicting a set of internal components 800*a*-800*c* and a set of external components 900*a*-900*c* that correspond to respective client computer 105*a*-105*c*, as well as a set of internal components 800*d* and a set of external components 900*d* that correspond to server computer 135. Internal components 800*a*-800*d* each include one or more processors 820, one or more computer readable RAMs 822 and one or more computer readable ROMs 824 on one or more buses 826, and one or more operating systems 828 and one or more computer readable tangible storage devices 830. The one or more operating systems 828 and device compatibility client software 110*a*-110*c* on respective client computer 105*a*-105*c*; and device compatibility server software 160 on server computer 135 are stored on one or more of the respective computer readable tangible storage devices 830 for execution by one or more of the respective processors 820 via one or more of the respective RAMs 822 (which typically include cache memory). In the embodiment illustrated in FIG. 3, each of the computer readable tangible storage devices 830 is a magnetic disk storage device of an internal hard drive. Alternatively, each of the computer readable tangible storage devices 830 is a semiconductor storage device such as ROM 824, EPROM, flash memory or any other computer readable tangible storage device that can store a computer program and digital information.

Each set of internal components 800*a*-800*d* includes a R/W drive or interface 832 to read from and write to one or more portable computer readable tangible storage devices 936 such as CD-ROM, DVD, memory stick, magnetic tape, magnetic disk, optical disk or semiconductor storage device. Device compatibility client software 110*a*-110*c* on respective client computers 105*a*-105*c*; and device compatibility server software 160 on server computer 135 can be stored on one or more of the respective portable computer readable tangible storage devices 936, read via the respective R/W drive or interface 832 and loaded into the respective hard drive or computer readable tangible storage device 830.

Furthermore, each set of internal components 800*a*-800*d* also includes a network adapter or interface 836 such as TCP/IP adapter card, wireless wi-fi interface card, or 3G or 4G wireless interface card or other wired or wireless communication link. Device compatibility client software 110*a*-110*c* on respective client computer 105*a*-105*c*; and device compatibility server software 160 on server computer 135 can be downloaded to respective client computers 105*a*-105*c* and respective server computer 135 from an external computer or external storage device via a network (for example, the Internet, a LAN, or a WAN) and respective network adapters or interfaces 836. From the network adapter or interface 836, device compatibility client software 110*a*-110*c* on respective client computers 105*a*-105*c*; and device compatibility server software 160 on server computer 135 are loaded into at least one respective hard drive or computer readable tangible storage device 830. The network may comprise copper wires, optical fibers, wireless transmission, routers, firewalls, switches, gateway computers and/or servers.

Each set of external components 900a-900d can include a computer display monitor 920, a keyboard 930, and a computer mouse 934. External components 900a-900d can also include touch screens, virtual keyboards, touch pads, pointing devices, and other human interface devices. Each set of internal components 800a-800d also includes device drivers 840 to interface to computer display monitor 920, keyboard 930 and computer mouse 934. The device drivers 840, R/W drive or interface 832 and network adapter or interface 836 comprise hardware and software in which the software is stored in computer readable tangible storage device 830 and/or ROM 824.

It should be appreciated that FIG. 3 provides only an illustration of one implementation and does not imply any limitations with regard to the environments in which different embodiments may be implemented. A variety of modifications to the depicted environments may be implemented. Moreover, a variety of modifications to the depicted environments may be made based on design and implementation requirements.

In accordance with the foregoing, a method, a computer system, and a computer program product have been disclosed for electronically generating recommendations for peripheral devices that are compatible with a processor and operating system of a computer. However, numerous modifications substitutions can be made without deviating from the scope of an embodiment of the invention. Therefore, one or more embodiments of the invention have been disclosed by way of example and not limitation.

What is claimed is:

1. A computer implemented method for generating recommendations for a peripheral device that is compatible with a processor and operating system comprising:
   identifying peripheral devices connected to one or more computers each having log files;
   determining whether the peripheral devices identified are functioning properly or not functioning properly;
   collecting information about a configuration of each of the one or more computers;
   setting parameters that create profiles for each of the one or more computers;
   storing the profiles and the log files in a database, wherein each of the log files is associated to one of the profiles;
   sending a request to a server computer, wherein the request has criteria to retrieve recommendations for peripheral devices that are functioning properly and are of a same class as at least one of peripheral devices identified and not functioning properly, and that are compatible with at least one processor and operating system of the one or more computers having the at least one of peripheral devices identified and not functioning properly;
   querying the database, in response to the request, for the profiles and the log files of the one or more computers having peripheral devices that satisfy the criteria; and
   generating the recommendations and electronic reports based on the profiles and the log files returned by the database in response to the querying.

2. The method of claim 1, wherein the step of identifying the peripheral devices connected to the one or more computers further comprises identifying a class of each of the peripheral devices, and wherein the class includes one of the following: computer mice, keyboards, hard disk, expansion cards, graphic cards, computer printers, image scanners, tape drives, microphones, speakers, and webcams.

3. The method of claim 1, wherein the step of determining whether the peripheral devices identified are functioning properly further comprises reading a log file, for example a memory dump file, stored on a hard disk of each of the one or more computers, and wherein the log file includes information on device driver errors as well as a listing of successful and unsuccessful installations of device drivers on client computers.

4. The method of claim 1, wherein the information about the configuration of each of the one or more computers comprises: a name of each manufacturer of the one or more computers; a product identifier (ID) of the one or more computers; a name of each manufacturer of each of the peripheral devices identified; a class of each of the peripheral devices identified; a product ID of each of the peripheral devices identified; a unique ID associated to each end-user that is utilizing the one or more computers; names and versions of operating systems installed on the one or more computers; type of processors in the one or more computers; device drivers installed or attempted to be installed on the one or more computers; and software applications and any service packs installed on the one or more computers.

5. The method of claim 1, wherein the step of setting the parameters that create the profiles for each of the one or more computers further comprises utilizing the information about the configuration of each of the one or more computers.

6. The method of claim 1, wherein the step of generating the recommendations and electronic reports comprises parsing the profiles to extract information about peripheral devices that are compatible with the at least one processor and operating system of the one or more computers.

7. The method of claim 1, wherein the recommendations include information about the following: peripheral devices having an expected compatibility with the at least one processor and operating system of the one or more computers having the at least one of peripheral devices identified and not functioning properly; whether a device driver that an end-user is attempting to install is compatible with the at least one processor and operating system of the one or more computers on which the end-user is attempting the install; whether older or newer versions of the device driver that the end-user is attempting to install is compatible with the at least one processor and operating system of the one or more computers on which the end-user is attempting the install; download locations of versions of device drivers that support the peripheral devices having an expected compatibility with the at least one processor and operating system of the one or more computers; customer satisfaction ratings by other end-users with respect to the peripheral devices having an expected compatibility with the at least one processor and operating system of the one or more computers; customer satisfaction ratings by the other end-users with respect to the versions of the device driver that support the peripheral devices having an expected compatibility with the at least one processor and operating system of the one or more computers; and other peripheral device owned by the end-user to use in place of the at least one of peripheral devices identified and not functioning properly.

8. A computer system for generating recommendations for a peripheral device that is compatible with a processor and operating system comprising:
   one or more processors, one or more computer readable memories, one or more computer readable storage media, and program instructions stored on the one or more storage media for execution by the one or more processors via the one or more memories, the program instructions comprising:

program instructions to identify peripheral devices connected to one or more computers each having log files;

program instructions to determine whether the peripheral devices identified are functioning properly or not functioning properly;

program instructions to collect information about a configuration of each of the one or more computers;

program instructions to set parameters that create profiles for each of the one or more computers;

program instructions to store the profiles and the log files in a database, wherein each of the log files is associated to one of the profiles;

program instructions to send a request to a server computer, wherein the request has criteria to retrieve recommendations for peripheral devices that are functioning properly and are of a same class as at least one of peripheral devices identified and not functioning properly, and that are compatible with at least one processor and operating system of the one or more computers having the at least one of peripheral devices identified and not functioning properly;

program instructions to query the database, in response to the request, for the profiles and the log files of the one or more computers having peripheral devices that satisfy the criteria; and program instructions to generate the recommendations and electronic reports based on the profiles and the log files returned by the database in response to the query.

9. The computer system of claim 8, wherein the program instructions to identify the peripheral devices connected to the one or more computers further comprises identifying a class of each of the peripheral devices, and wherein the class includes one of the following: computer mice, keyboards, hard disk, expansion cards, graphic cards, computer printers, image scanners, tape drives, microphones, speakers, and webcams.

10. The computer system of claim 8, wherein the program instructions to determine whether the peripheral devices identified are functioning properly further comprises reading a log file, for example a memory dump file, stored on a hard disk of each of the one or more computers, and wherein the log file includes information on device driver errors as well as a listing of successful and unsuccessful installations of device drivers on client computers.

11. The computer system of claim 8, wherein the information about the configuration of each of the one or more computers comprises: a name of each manufacturer of the one or more computers; a product identifier (ID) of the one or more computers; a name of each manufacturer of each of the peripheral devices identified; a class of each of the peripheral devices identified; a product ID of each of the peripheral devices identified; a unique ID associated to each end-user that is utilizing the one or more computers; names and versions of operating systems installed on the one or more computers; type of processors in the one or more computers; device drivers installed or attempted to be installed on the one or more computers; and software applications and any service packs installed on the one or more computers.

12. The computer system of claim 8, wherein the program instructions to set the parameters that create the profiles for each of the one or more computers further comprises utilizing the information about the configuration of each of the one or more computers.

13. The computer system of claim 8, wherein the program instructions to generate the recommendations and electronic reports comprises parsing the profiles to extract information about peripheral devices that are compatible with the at least one processor and operating system of the one or more computers.

14. The computer system of claim 8, wherein the recommendations include information about the following: peripheral devices having an expected compatibility with the at least one processor and operating system of the one or more computers having the at least one of peripheral devices identified and not functioning properly; whether a device driver that an end-user is attempting to install is compatible with the at least one processor and operating system of the one or more computers on which the end-user is attempting the install; whether older or newer versions of the device driver that the end-user is attempting to install is compatible with the at least one processor and operating system of the one or more computers on which the end-user is attempting the install; download locations of versions of device drivers that support the peripheral devices having an expected compatibility with the at least one processor and operating system of the one or more computers; customer satisfaction ratings by other end-users with respect to the peripheral devices having an expected compatibility with the at least one processor and operating system of the one or more computers; customer satisfaction ratings by the other end-users with respect to the versions of the device driver that support the peripheral devices having an expected compatibility with the at least one processor and operating system of the one or more computers; and other peripheral device owned by the end-user to use in place of the at least one of peripheral devices identified and not functioning properly.

* * * * *